(12) United States Patent
Fourie et al.

(10) Patent No.: US 10,173,764 B1
(45) Date of Patent: Jan. 8, 2019

(54) SEALS FOR GORED BALLOON

(71) Applicant: LOON LLC, Mountain View, CA (US)

(72) Inventors: Daniel Henry Fourie, Sunnyvale, CA (US); Kevin Roach, Boulder Creek, CA (US)

(73) Assignee: LOON LLC, Mountain View, CA (US)

( * ) Notice: Subject to any disclaimer, the term of this patent is extended or adjusted under 35 U.S.C. 154(b) by 0 days.

(21) Appl. No.: 16/018,468

(22) Filed: Jun. 26, 2018

Related U.S. Application Data

(62) Division of application No. 14/858,595, filed on Sep. 18, 2015, now Pat. No. 10,029,776.

(51) Int. Cl.
    *B64B 1/58* (2006.01)
    *B64B 1/40* (2006.01)
    *B29C 65/74* (2006.01)
    *B29C 65/02* (2006.01)
    *B29L 22/02* (2006.01)

(52) U.S. Cl.
    CPC .............. *B64B 1/58* (2013.01); *B29C 65/02* (2013.01); *B29C 65/749* (2013.01); *B64B 1/40* (2013.01); *B29L 2022/022* (2013.01)

(58) Field of Classification Search
    CPC .. B64B 1/40; B64B 1/58; B29C 65/02; B29C 65/749; B29C 65/18
    See application file for complete search history.

(56) References Cited

U.S. PATENT DOCUMENTS

| | | |
|---|---|---|
| 2,756,948 A | 7/1956 | Winzen et al. |
| 2,767,941 A | 10/1956 | Gegner et al. |
| 2,900,147 A | 8/1959 | Huch et al. |
| 2,931,597 A | 4/1960 | Moore, Jr. |
| 2,960,282 A | 11/1960 | Winzen |
| 3,041,019 A | 6/1962 | Froehlich |
| 3,109,611 A * | 11/1963 | Yost ................ B29C 65/72 244/31 |
| 3,119,578 A | 1/1964 | Borgeson et al. |
| 3,131,889 A | 5/1964 | Yost |

(Continued)

FOREIGN PATENT DOCUMENTS

| | | |
|---|---|---|
| GB | 555831 A | 9/1943 |
| GB | 749791 A | 5/1956 |
| WO | 1995/004407 A1 | 2/1995 |

OTHER PUBLICATIONS

Anatine_aero. Bovine Aerospace. The sky is not our limit. Tag Archives: weather balloon. Jun. 5, 2013, 14 pages. Retrieved from <http://bovineaerospace.wordpress.com/tag/weather-balloon/>.

*Primary Examiner* — Philip J Bonzell
(74) *Attorney, Agent, or Firm* — Lerner, David, Littenberg, Krumholz & Mentlik, LLP

(57) ABSTRACT

Aspects of the disclosure relate to techniques for manufacturing a balloon envelope. In one example, a first sheet of material for a first gore of the balloon envelope is provided. Lap seal material is arranged at least partially on the first sheet of material. A first heat seal is created between the lap seal material and the first sheet of material. A second sheet of material for a second gore of the balloon envelope is arranged over the first heat seal. A second heat seal is created between the lap seal material and the second sheet of material such that the lap seal material is configured to provide additional structural support to the balloon envelope.

11 Claims, 10 Drawing Sheets

(56) References Cited

U.S. PATENT DOCUMENTS

| | | |
|---|---|---|
| 3,451,649 A | 6/1969 | Weiss et al. |
| 3,679,155 A | 7/1972 | Centofanti |
| 3,860,201 A | 1/1975 | Hall |
| 4,077,588 A | 3/1978 | Hurst |
| 4,262,864 A | 4/1981 | Eshoo |
| 4,432,513 A | 2/1984 | Yost |
| 4,434,958 A | 3/1984 | Rougeron et al. |
| 4,494,714 A | 1/1985 | Hill et al. |
| 4,529,153 A | 7/1985 | Conn |
| 4,651,956 A | 3/1987 | Winker et al. |
| 4,877,205 A * | 10/1989 | Rand ............... B29C 65/18 244/31 |
| 5,149,019 A | 9/1992 | Stenlund |
| 5,538,451 A | 7/1996 | Sherer |
| 5,992,795 A | 11/1999 | Tockert |
| 6,234,425 B1 | 5/2001 | Rand et al. |
| 6,325,329 B1 | 12/2001 | Meadows |
| 6,628,941 B2 | 9/2003 | Knoblach et al. |
| 7,203,491 B2 | 4/2007 | Knoblach et al. |
| 7,275,496 B2 | 10/2007 | French et al. |
| 7,356,390 B2 | 4/2008 | Knoblach et al. |
| 7,648,102 B2 | 1/2010 | French et al. |
| 7,801,522 B2 | 9/2010 | Knoblach et al. |
| 8,256,716 B2 | 9/2012 | Dietrich et al. |
| 8,644,789 B2 | 2/2014 | Knoblach et al. |
| 8,882,026 B2 | 11/2014 | Huens |
| 9,139,278 B1 | 9/2015 | Roach et al. |
| 9,371,123 B2 | 6/2016 | Roach et al. |
| 9,689,808 B1 | 6/2017 | Fourie |
| 2002/0175243 A1 | 11/2002 | Black et al. |
| 2003/0018351 A1 | 1/2003 | Kaji et al. |
| 2003/0040273 A1 | 2/2003 | Seligsohn et al. |
| 2004/0238692 A1 | 12/2004 | Kavanagh |
| 2005/0006523 A1 | 1/2005 | French et al. |
| 2005/0014499 A1 | 1/2005 | Knoblach et al. |
| 2005/0224639 A1 | 10/2005 | Kavanagh |
| 2006/0063529 A1 | 3/2006 | Seligsohn et al. |
| 2006/0192054 A1 | 8/2006 | Lachenmeier |
| 2007/0199503 A1 | 8/2007 | French et al. |
| 2009/0272840 A1 | 11/2009 | Dietrich et al. |
| 2010/0123040 A1 | 5/2010 | Baxter et al. |
| 2011/0297784 A1 | 12/2011 | Huens |
| 2013/0066267 A1 | 3/2013 | Kwok et al. |
| 2013/0261547 A1 | 10/2013 | Aggerholm et al. |
| 2014/0203135 A1 | 7/2014 | Walter |
| 2014/0277059 A1 | 9/2014 | Lam et al. |
| 2014/0367511 A1 | 12/2014 | Knoblach et al. |
| 2015/0174817 A1 | 6/2015 | Roach et al. |
| 2015/0266560 A1 | 9/2015 | Ratner et al. |
| 2016/0263815 A1 | 9/2016 | Roach et al. |

* cited by examiner

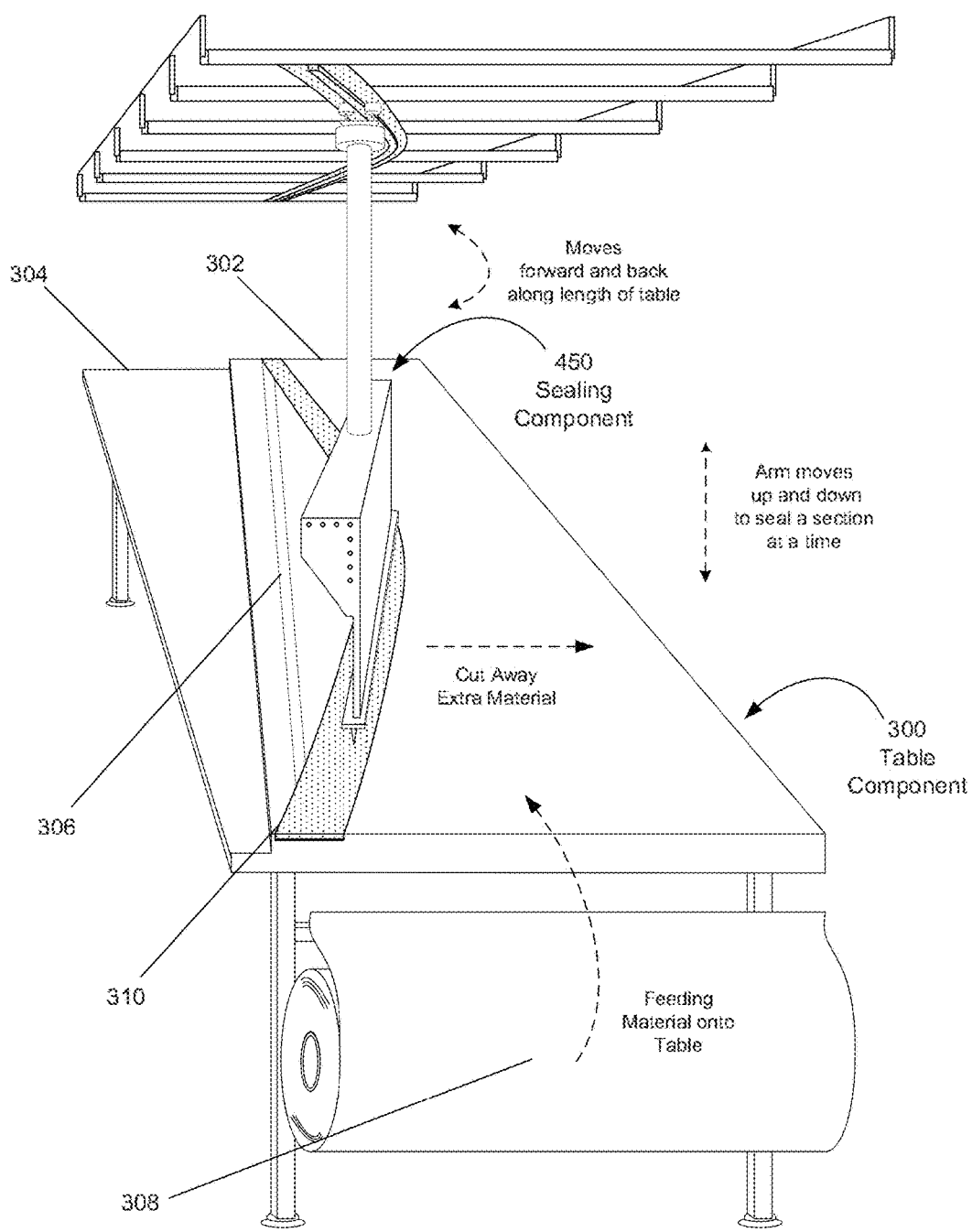

800

SEALS FOR GORED BALLOON

CROSS-REFERENCE TO RELATED APPLICATION

The present application is a divisional of U.S. patent application Ser. No. 14/858,595, filed Sep. 18, 2015, the disclosure of which is incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

BRIEF SUMMARY

Aspects of the present disclosure relate to a method of manufacturing a balloon envelope. The method includes providing a first sheet of material for a first gore of the balloon envelope; arranging lap seal material at least partially on the first sheet of material; creating a first heat seal between the lap seal material and the first sheet of material; arranging a second sheet of material for a second gore of the balloon envelope over the first heat seal; and creating a second heat seal between the lap seal material and the second sheet of material such that the lap seal material is configured to provide additional structural support to the balloon envelope.

In one example, the second heat seal is wider than the first heat seal. In another example, the second heat seal and the first heat seal extend along a length of the lap seal material corresponding to a length of the first and second gores. In another example, the method also includes before creating the second heat seal, folding the lap seal material over onto itself. In this example, the method also includes applying pressure to the folded lap seal material in order to crease the folded lap seal material prior to arranging the second sheet of material. In addition, the lap seal material includes a substance configured to prevent the folded lap seal material from being heat sealed to itself. In another example, the lap seal material extends along only a portion of the first gore. In this example, the lap seal material is arranged such that the lap seal material is located proximate to an equator of the balloon envelope. In another example, the method also includes, after creating the first heat seal and in conjunction with creating the second heat seal, cutting away excess material. In another example, the first heat seal is created using a first heat sealing device and the second heat seal is created using a second heat sealing device different from the first heat sealing device. In another example, the first heat seal is created by heating a first portion of a heat sealer and the second heat seal is created by heating a second portion of the heat sealer that is wider than the first portion such that the first heat seal is narrower than the second heat seal.

A further aspect of the disclosure provides a system. The system includes a balloon envelope having a plurality of gores and lap seal material forming a structural support between two gores of the plurality of gores. The lap seal material is attached to one of the two gores via a first heat seal and another of the two gores via a second heat seal.

In one example, the leap seal material runs along lengths of both of the one of the two gores and the another of the two gores. In another example, wherein the lap seal material is positioned proximate to an equator of the balloon envelope. In another example, the second heat seal is wider than the first heat seal. In another example, a surface of the lap seal material includes a substance which prevents the lap seal material from being heat sealed to itself. In another example, the lap seal material is arranged on an exterior surface of the balloon envelope. In another example, the lap seal material is arranged on an interior surface of the balloon envelope. In another example, the system also includes first heat sealer for creating the first heat seal. In addition, the system also includes a second heat sealer for creating the second heat seal.

BRIEF DESCRIPTION OF THE DRAWINGS

FIG. 5 is an example of a balloon gore manufacturing apparatus in accordance with aspects of the present disclosure.

DETAILED DESCRIPTION

Figure 1:
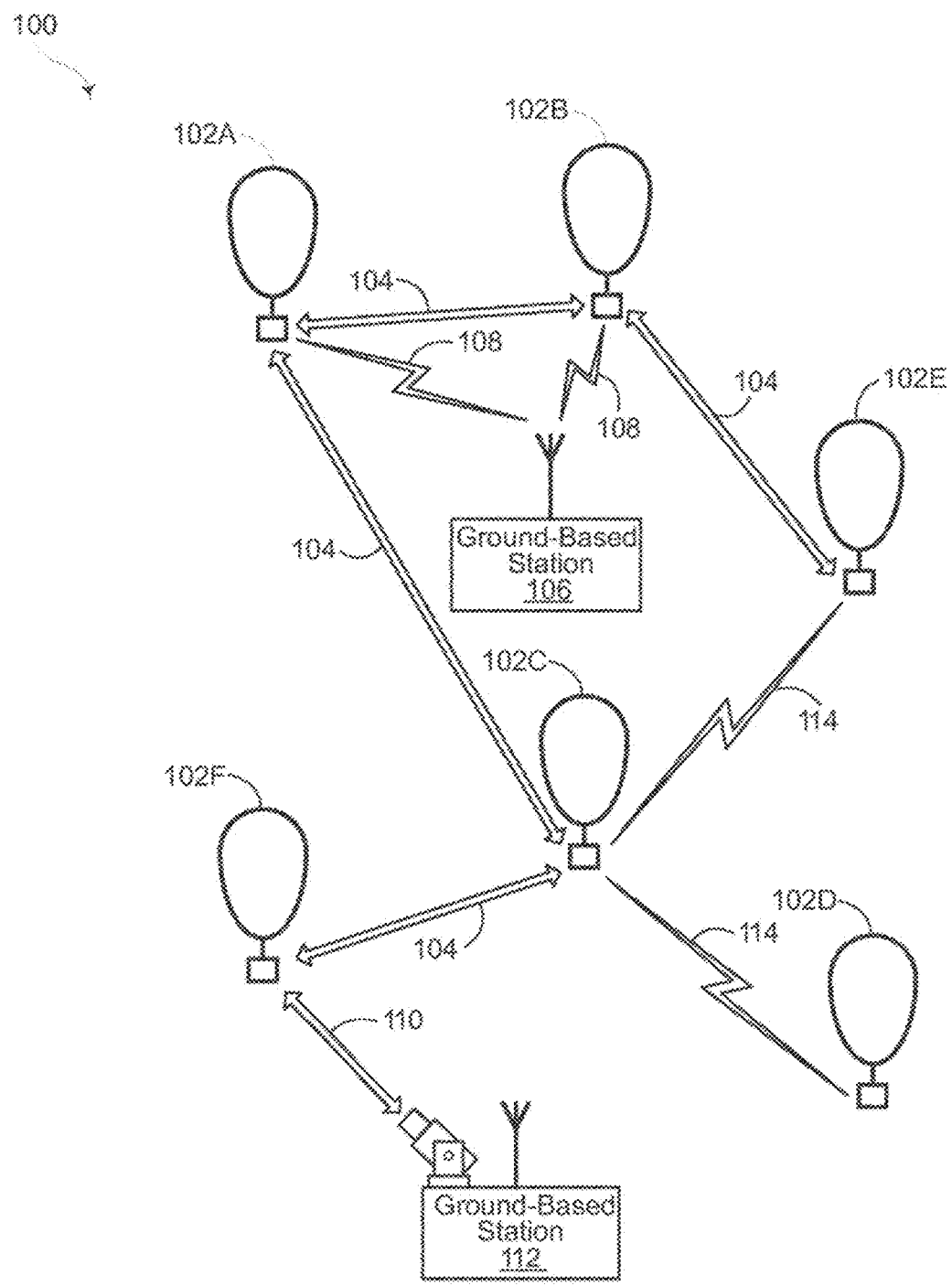
FIG. 1 is a functional diagram of a system in accordance with aspects of the present disclosure.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure generally relates to high-altitude balloons such as those used in communication networks. A single network may include a large number of balloons, each of which includes a balloon envelope arranged to carry a payload of devices. In some examples, manufacturing of a single balloon envelope involves heat sealing portions of envelope material together in order to produce the gores. Given the nature of the use of these balloons it is important that the seams between the gores be strong and able to withstand significant forces. In that regard, the gores may include additional material in order to strengthen them.

In some examples, manufacturing of the balloon envelope involves heat sealing portions of envelope material together in order to produce the gores. For instance, portions of material which will form the gores may be laid out on a table and then sealed together to form a fin seal, for example, using a heat bond. This heat bond of the material can be employed using various techniques. In one example, a balloon gore sealing machine including a table and an overhead heat sealer may be used in order to at least partially automate the manufacturing process. The heat sealer may be configured so that it can travel along a length of the table by traversing a track positioned above the table. The heat sealer may apply a heat bonding seal in order to join together the portions in a downward pressing motion, one section at a time along a heat sealing portion of the table. The heat sealer may also include a cutting edge for removing excess material. In this example, the heat sealer moves, seals, cuts, and moves again until it completes a seam along the length of the balloon envelope made from bonding the sheets together known as a fin seal. By repeating this process several times, a balloon envelope may take its gored shape.

To provide further structural support along the seams, additional material may be used. As an example, rather than the fin seal described above, a lap seal which uses an additional piece of envelope material may be used. In one instance, lap seal material may be placed around the portions of balloon envelope material in a c-shape. In this regard, the lap seal material may be located on an internal surface of a completed balloon envelope. In order to secure the lap seal material to the balloon envelope, the lap seal material may be placed on the table before the first portion of balloon envelope material, then the first and second portions of balloon envelope material overlaid onto the lap seal material. The lap seal material may then be folded over the second portion of balloon envelope material forming the c-shape around the first and second portions of balloon envelope material. The lap seal and portions of balloon envelope material may then be sealed to one another in a single effort. However, because of the slippery nature of the balloon envelope material and because the lap seal material and portions of balloon envelope material would have to be pre-cut (prior to heat sealing) and lined up precisely, this c-shaped configuration may be much more difficult to arrange and maintain during the heat sealing process than the two-step heat seal method described above.

Thus, rather than arranging and folding the lap seal material over the portions of balloon envelope material to form the c-shape lap seal, lap seal material may be placed on a first portion of balloon envelope material, sealed, folded, covered by a second portion of balloon envelope material, and sealed again. In this regard, a folded lap seal may be created using a process having two separate heat sealing steps.

For instance, prior to the first heat sealing step, the first portion of balloon envelope material may be laid out on the table. The lap seal material may then be placed onto the first portion of balloon envelope material over the heat sealing portion of the table. Before placing the second portion of balloon envelope material on the table, the first portion of balloon envelope material may be heat sealed to the lap seal material to form a first heat seal.

This first heat seal may be applied without the cutting the first portion of balloon envelope material or the lap seal material. In this regard, if the heat sealer includes the cutting edge, the cutting edge may be moved out of the way or turned off (if heat activated). Thus, when the first heat seal is completed, the cutting edge would not yet cut the excess balloon envelope material.

The lap seal material may then be folded over itself. At the same time, the lap seal material may also be creased using additional pressure on the fold line in order to increase the likelihood that the lap seal material will stay folded over itself when the second portion of balloon envelope material is laid out.

The second portion of balloon envelope material may be laid out on the table and over the folded lap seal material. A second heat seal may then be applied. The lap seal material may be configured such that the interior surface of the lap seal material (that which is folded onto itself) includes a non-sealing surface coating to prevent the lap seal material from being sealed to itself by the second heat seal and achieve a lap seal in a fin seal sealing configuration.

In order to increase the likelihood that the second heat seal will overlie the folded lap seal material, the second heat seal may be wider than the first heat seal. This may be achieved by heating a larger area of the heat sealer or simply using a second heat sealer. Because of this, the position of the second heat seal may be more tolerant; some sliding of the portions of material relative to one another may be acceptable. In other words, it may be sufficient if the folded edge of the lap seal material lands within the seal width of the heat sealer.

In addition, the first and second seals may be shifted relative to one another, such that the first heat seal and the second heat seal occur along different areas of the table. In this regard, the heat sealer may be moved laterally between the first heat seal and the second heat seal, or two heat sealers may be moved along adjacent tracks.

Excess material may be cut away from the material after or in conjunction with the second heat seal. In this regard, the cutting edge of the heat sealer may be used or turned on (if heat activated). Alternatively, if different heat sealers are used, the second heat sealer may include the cutting edge while the first may not include a cutting edge.

This process may be repeated for any number of additional gores until the balloon envelope is complete. Once completed, the lap seal material may be located on an interior surface of the balloon envelope and along the gore seams. Alternatively, the balloon envelope could be flipped, and the folded lap seal material located on an exterior surface of the balloon envelope. Both arrangements would provide approximately equivalent structural support.

The folded lap seal may be used along an entire length or on discrete sections of all or less than all of the gores. If only a discrete section is to include the lap seal, the same processes described above may be used, but multiple pieces of lap seal material may be used at different points on the gore seal corresponding to high load areas such as at the equator of the balloon or just below this point on each gore seal.

Although the features described herein increase the number of heat seals required to complete a balloon, the additional structural support afforded by the lap seal may provide a significant increase in the usability and life of a balloon. Thus, while the fin seal may be simpler to manufacture, it lacks the structural benefits of the c-shaped and folded lap seals. If the portions of envelope material and lap seal material are arranged correctly, the final construction of a c-shape lap seal and a folded lap seal are identical. However, the folded lap seal two part sealing process makes the portions of balloon material and lap seal material much easier to arrange relative to one another than the c-shaped lap seal.

Example System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
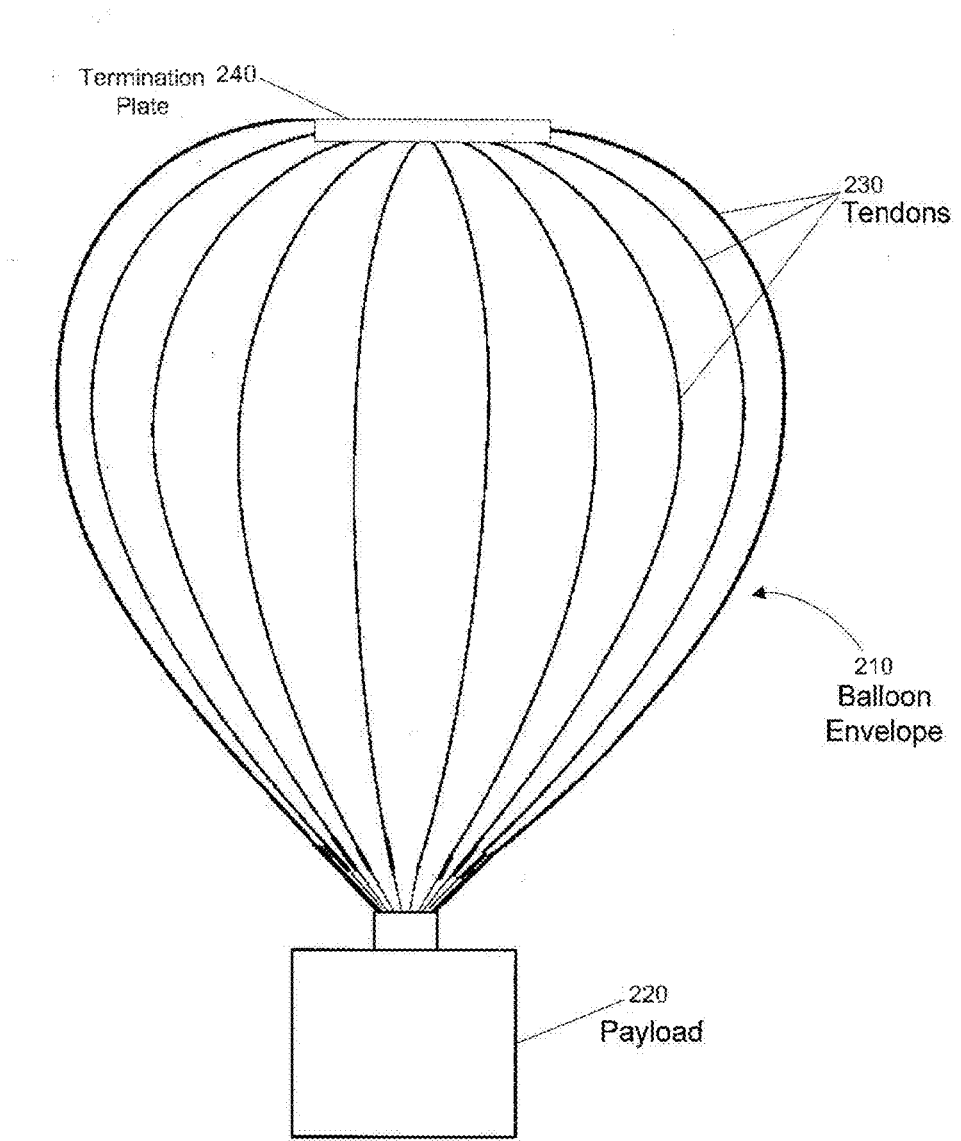
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of balloon envelope 210. Bottom ends of the tendons 230, 240 and 250 may also be connected to one another. For example, a corresponding apparatus, e.g., base plate 202, may be disposed at a base or bottom of the balloon envelope 210. The top plate 201 at the apex may be the same size and shape as and base plate 202 at the bottom of the balloon envelope. Both plates may include corresponding components for attaching the tendons 230, 240 and 250 to the balloon envelope 210.

In some examples, manufacturing of the balloon envelope involves heat sealing portions of envelope material together in order to produce the gores. For instance, portions of material which will form the gores may be laid out on a table and then sealed together, for example, using a heat bond. This heat bond of the material can be employed using various techniques.

Figure 3:
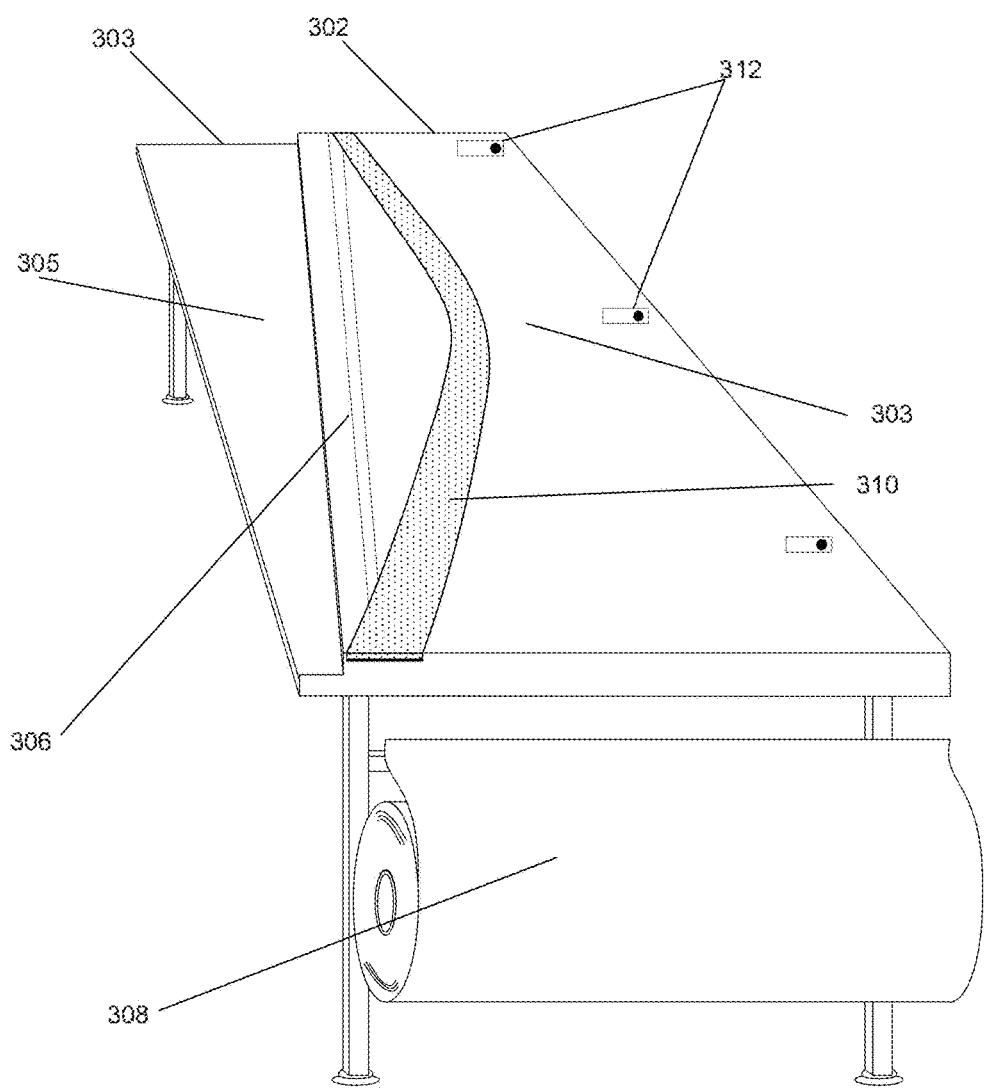
FIG. 3 is an example of a table component of a balloon gore manufacturing apparatus in accordance with aspects of the present disclosure.

In one example, a balloon gore sealing machine or assembly including a table may be used. In FIG. 3, one example of a table component 300 for the assembly is shown. As shown, the table component 300 includes a first level 302 and a second level 304 and an indicator 306 disposed on a surface 303 of the first level 302. The indicator 306 may be used to mark a position on the table component 300 for placing a tendon on an envelope gore being manufactured. The table component 300 made me used for shaping and heat-sealing together individual envelope gores made from sheets of balloon material 308 (shown as rolled). In this regard, the table component 300 also includes a curve strip 310 that can be used to indicate where the heat seal may occur, for example, at an edge of the envelope gore created from the roll of balloon material 308.

A sheet of the material 308 may be fed onto the table component 300 in order to create a given envelope gore. For example, a straight sheet of the balloon material 308 may be rolled out onto the table either manually or automatically using a belt driven track (not shown). Once the balloon material 308 is rolled out, it may be held down on the table component 300 using a series of restraints or clamps 312. The series of clamps 312 may help keep the balloon material 308 from shifting while it is being worked on.

First level 302 may be a working area of the table component 300. The first level 302 may include a smooth top layer of a compliant material, such as fiberglass and/or silicone, or other types of types of similar materials that have a level of heat resilience. The table component 300 may include also additional heat resistant material where the heat seal occurs, such as at curve strip 310. The curve strip 310 may include additional material, such as fiberglass impregnated with a polytetrafluoroethylene (PTFE) coating, which has a higher melting point than the top layer coating of the table component 300. This extra coating may also help prevent the material 308 from sticking to the table component 300 due do the heat sealing being conducted at the strip 310.

Second level 304 of the table component 300 may be configured for stacking up assembled envelope gores of the balloon envelope. For example, the second level 304 may include a trough like resting area for holding the envelope gores during manufacture. A surface 305 of the second level 304 may be configured so that the surface is wide enough to stack up a plurality of assembled envelope gores including the tendon attached to each gore portion.

Figure 4:
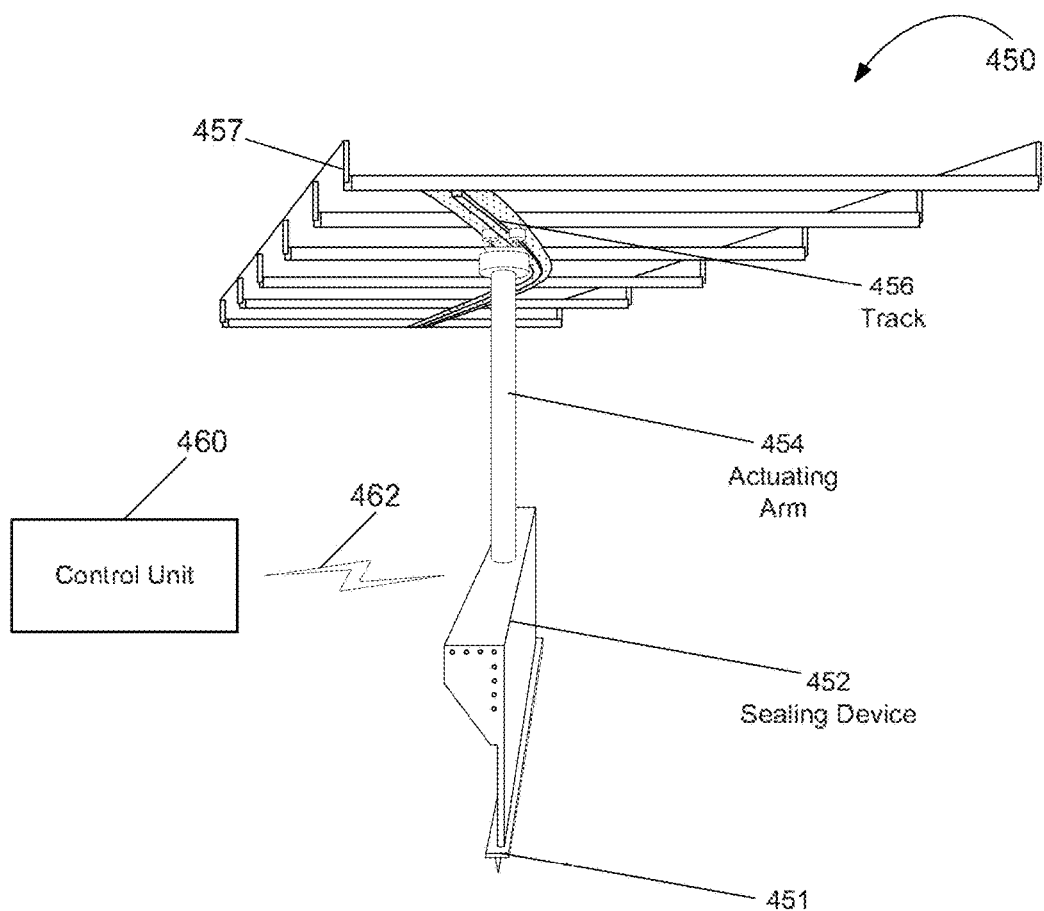
FIG. 4 is an example of a heat sealer component of a balloon gore manufacturing apparatus in accordance with aspects of the present disclosure.

An overhead heat sealer may be used in order to at least partially automate the manufacturing process. FIG. 4 is an example of a sealing component 450 for the assembly, and FIG. 5 is an example of an assembly 500 including both the table component and sealing component 450. In this example, the sealing component 450 includes a sealing device 452 coupled to the track 456 via an actuating arm 454. In some examples, a control unit 460 may be utilized for controlling operations of the sealing component 450 using communication link 462, which can be a wired or wireless link.

Sealing device 452 may include an electrically heatable element 451 disposed on the device. The heatable element 451 may be of a predetermined width and length that may be used to unite layers of the balloon material. For example, the heatable element 451, when activated, for example by a flow of electricity, may reach a certain temperature that is hot enough to heat bond or otherwise melting a section of two sheets of balloon material together forming a fin seal. In some embodiments, sealing device 452 may provide a combination of operations for heat sealing and cutting of the balloon material 408. For example, the sealing device 452 may be configured to cut the balloon material 408 by using heat and an amount of pressure or blade like cutting members (not shown) attached to the heatable element 451.

The sealing component 450 may be configured so that it can travel along a length of the table by traversing a track positioned above the table. For example, sealing device 452 may be moved along track 456 mounted on an overhead support 457. The track 456 can be configured so that sealing device 452 can move forward and back horizontally by using actuating arm 454. This forward and back movement of the sealing device 452 along track 456 can be manually or automatically operated, for example, by using commands from the communication unit 460.

The actuating arm 454 can also be activated to cause the sealing device 452 to move vertically. For example, the actuating arm 454 may include housing (not shown) that can extend and retract the arm between first and second positions. In some aspects, extension of the actuating arm 454 allows the sealing device 452 to be pressed against the balloon material in order to cause the heat bond activation. As with the movement along track 452, the actuating arm 454 can extend and/or retract manually, automatically or some combination thereof, for example, by using commands from communication unit 460.

Figures 6A, 6B:
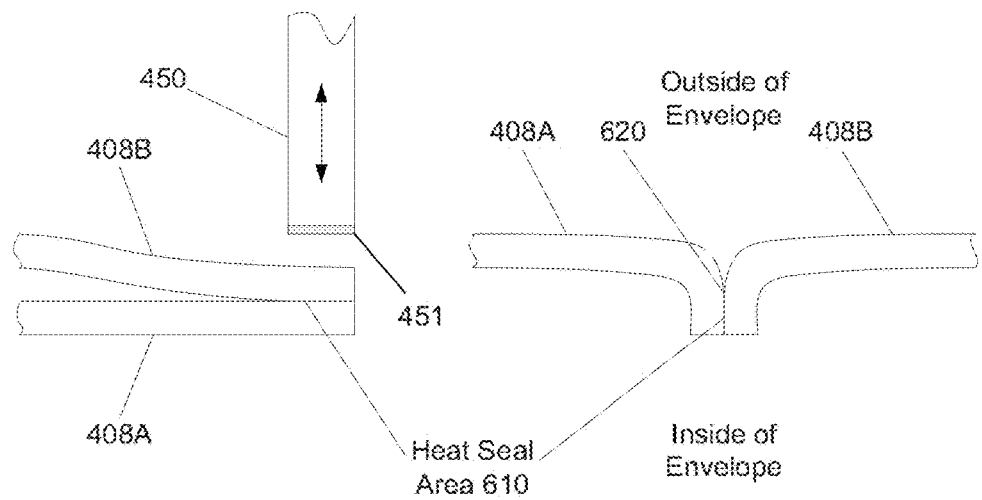
FIGS. 6A and 6B are an example of a fin seal in accordance with aspects of the present disclosure.

Once two portions of the balloon material 408 are in place on the table component 200, the sealing component 450 may apply a heat bonding seal in order to join together the portions in a downward pressing motion, one section at a time along the strip 310. The sealing component 450 may also include a cutting edge (not shown) for removing excess material. In this example, the heat sealer moves, seals, cuts, and moves again until it completes a seam along the length of the balloon envelope made from bonding the sheets together known as a fin seal. FIGS. 6A and 6B are example side views of portions of balloon envelope material 408A and 408B. In this example, portion 408B is heat sealed to 408A at heat seal area 610 by heatable element 451 of sealing component 450. FIG. 6B is a similar side view, but more clearly shows how the fin seal forms a gore line 620 between two gores (one corresponding to portion 408A and another corresponding to 408B) when the portions of material are pulled away from one another. By repeating this process several times, balloon envelope 210 may take its gored shape.

Figure 7A:
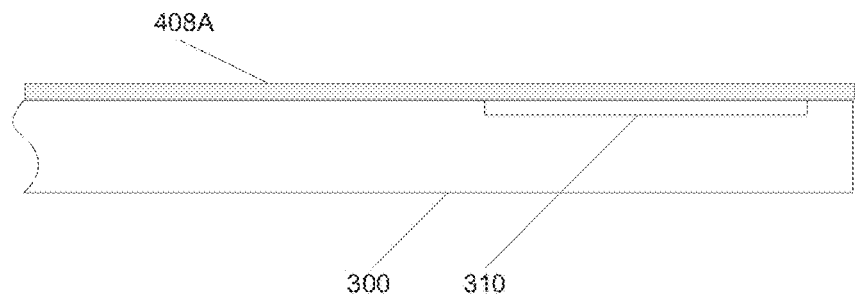
FIGS. 7A-7G are an example of a process for forming a lap seal in accordance with aspects of the present disclosure.
Figure 7B:
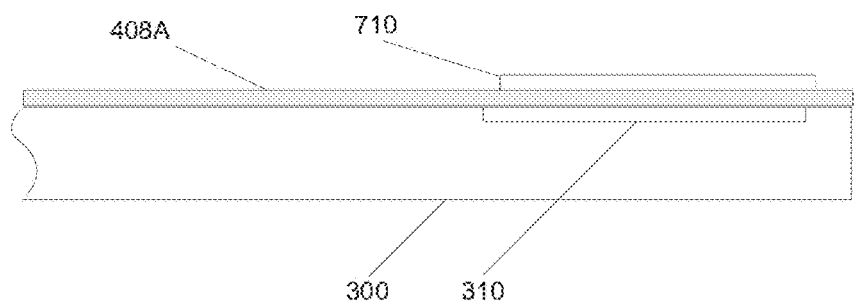

As noted above, to provide further structural support along the seams of a balloon, additional material may be used. As another example, rather than the fin seal described above, a folded lap seal may be used. In this regard, a process having two heat sealing steps as depicted in FIGS. 7A through 7G may be used. For instance, turning to FIG. 7A, prior to the first heat sealing step, the first portion of balloon envelope material 408A may be laid out on the table component 300 and over strip 310. As shown in FIG. 7B, once the first portion of balloon envelope material 408A is in position, lap seal material 710 may then be placed onto the first portion of balloon envelope material 408A and over the strip 310.

Figure 7C:
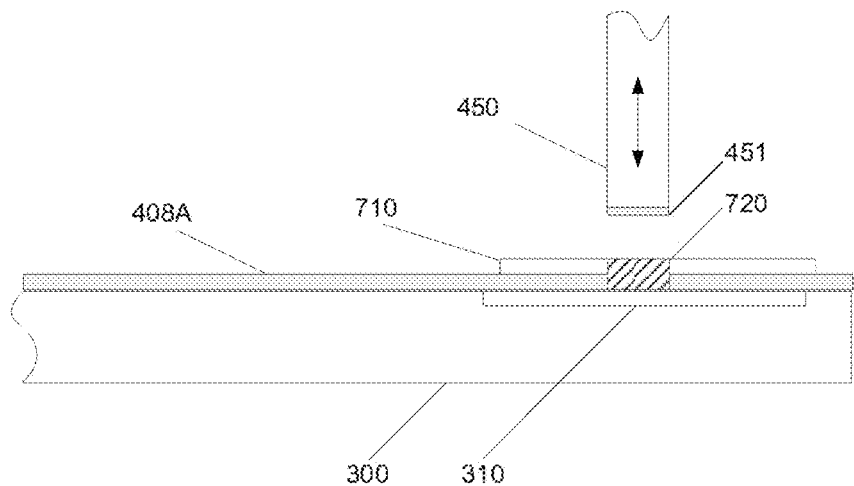

At this point, before placing the second portion of balloon envelope material 408B on the table, the first portion of balloon envelope material 408A may be heat sealed to the lap seal material 710 to form a first heat seal 720 as shown in FIG. 7C. The size and shape of first heat seal 720 is exaggerated for ease of understanding. This first heat seal 720 may be applied without the cutting the first portion of balloon envelope material or the lap seal material. In this regard, if the sealing component 450 includes a cutting edge, the cutting edge may be moved out of the way or turned off (if heat activated). Thus, when the first heat seal is completed, the cutting edge would not yet cut the excess balloon envelope material of the first portion of balloon envelope material 408A as shown in FIGS. 7C and 7D.

Figure 7D:
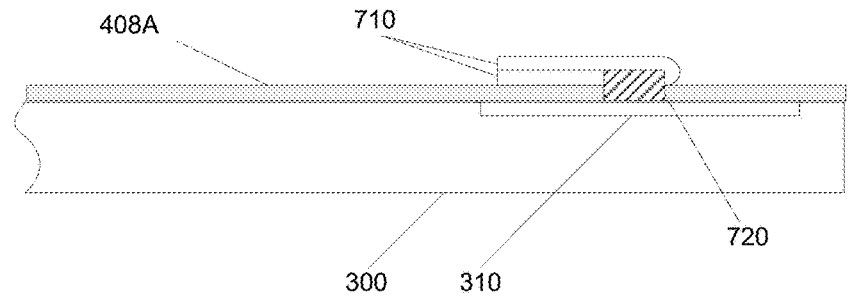

The lap seal material 710 may then be folded over itself as shown in FIG. 7D. At the same time, the lap seal material 710 may also be creased using additional pressure on the fold line 712 in order to increase the likelihood that the lap seal material will stay folded over itself when the second portion of balloon envelope material is laid out.

Figure 7E:
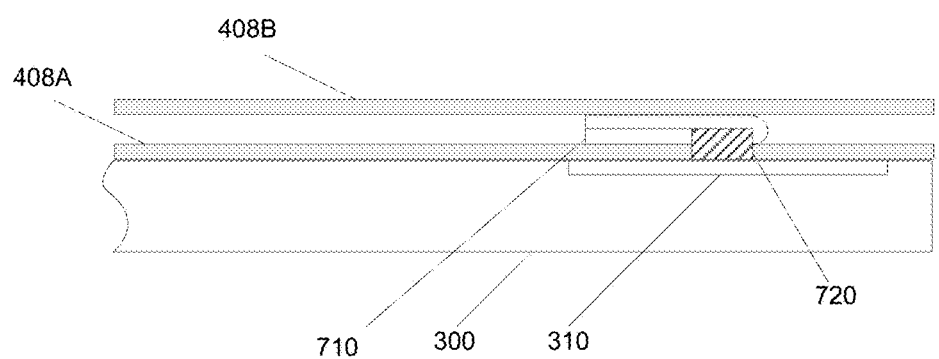
Figure 7F:
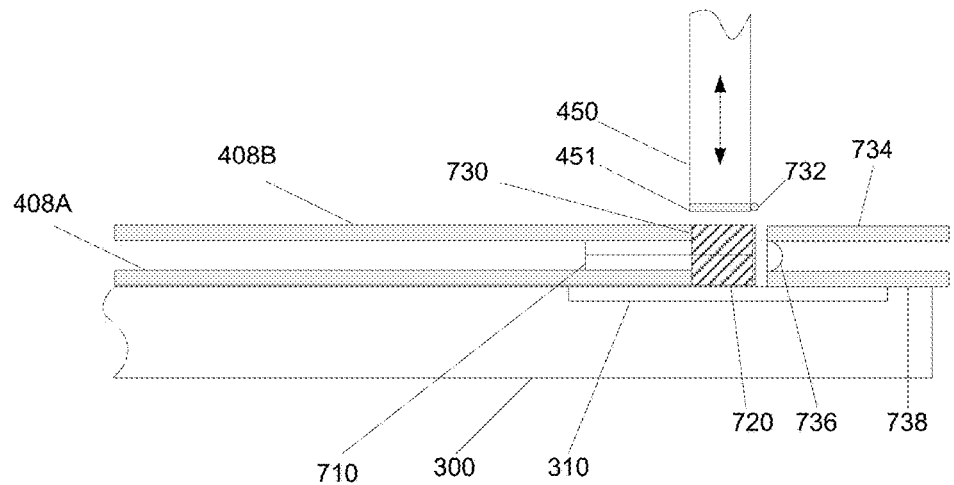

Next, as shown in FIG. 7E, the second portion of balloon envelope material 408B may be laid out on the table component 300 and over the folded lap seal material 710. A second heat seal 730 may then be applied by sealing component 450 by way of heatable element 451. In some examples, the lap seal material may be configured such that the interior surface of the lap seal material (that which is folded onto itself) includes a non-sealing surface coating to prevent the lap seal material from being sealed to itself along line 740 by the second heat seal and achieve a lap seal in a fin seal sealing configuration.

In order to increase the likelihood that the second heat seal will overlie the folded lap seal material, the second heat seal may be wider than the first heat seal. This may be achieved by heating a larger area of the heat sealer or simply using a second heat sealer such as sealing component 750 having a heatable element 751. Other than the width of the heatable element 751, heat sealer 750 may be configured similarly to and may be incorporated into heat sealer 450. Because of this, the position of the second heat seal 730 may be more tolerant; some sliding of the portions of material 408A and 408B relative to one another may be acceptable. In other words, it may be sufficient if the folded edge of the lap seal material 710 lands within the seal width of the heatable element 751.

In addition, the first and second seals may be shifted relative to one another, such that the first heat seal and the second heat seal occur along different areas of the table. In this regard, the heat sealer may be moved laterally between the first heat seal and the second heat seal, or two heat sealers may be moved along adjacent tracks.

Excess material may be cut away from the material after or in conjunction with the second heat seal. In this regard, a cutting edge 732 of the heat sealer may be used or turned on (if heat activated). In this regard, excess material 734, 736, and 738 may be cut away from the heat sealed material and discarded. Alternatively, if different heat sealers are used, the second heat sealer may include the cutting edge while the first may not include a cutting edge.

Figure 7G:
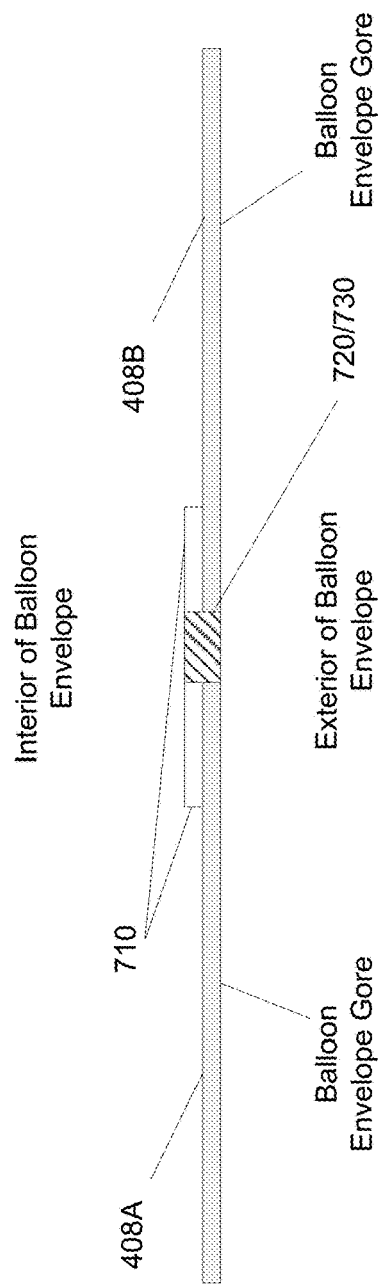

This process may be repeated for any number of additional gores until the balloon envelope is complete. Once completed, the portions of balloon envelope material 408A and 408B may be pulled away from one another to form two different balloon envelope gores. As an example, the lap seal material may be located on an interior surface of the balloon envelope and along the gore seams. FIG. 7G is an example of the completed lap seal (c-shaped or folded) between portions of balloon envelope material 408A and 408B which form two different gores of the balloon envelope. In this example, the lap seal material is located at the interior of the balloon envelope. Alternatively, the balloon envelope could be flipped, and the lap seal material located on an exterior surface of the balloon envelope. Both arrangements would provide approximately equivalent support.

The lap seal material may be used along an entire length or on discrete sections of all or less than all of the gores. If only a discrete section is to include the folded (or c-shaped) lap seal, the same processes described above may be used, but multiple pieces of lap seal material may be used at different points on the gore seal corresponding to high load areas such as at the equator of the balloon (i.e. halfway between the apex and base of the balloon envelope) or just below this point on each gore seal.

Figure 8:
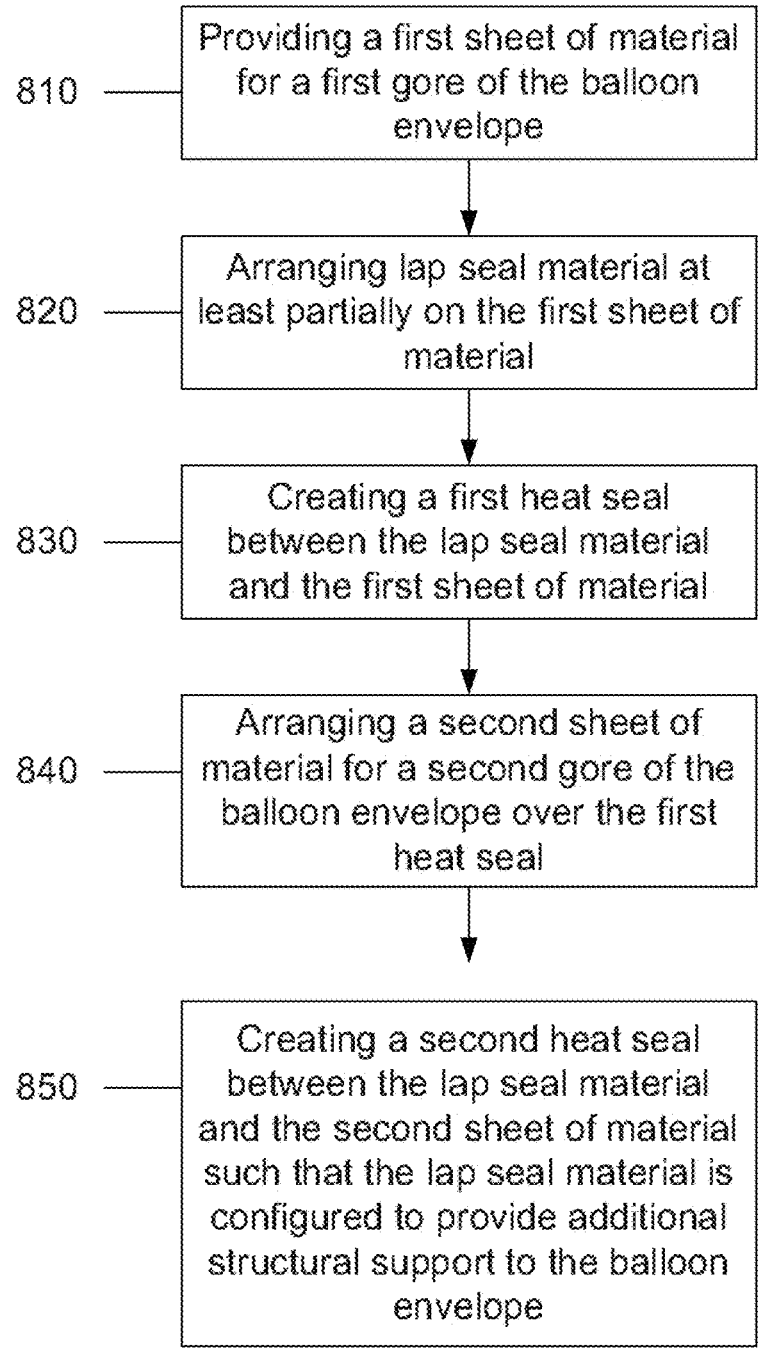
FIG. 8 is an example flow diagram in accordance with aspects of the disclosure.

To better aid in understanding an example of some of the aspects described above, reference is now made to FIG. 8, which illustrates a flow diagram 800 depicting a method of manufacturing a balloon envelope. As previously discussed, the following operations do not have to be performed in the precise order described below. Rather, as mentioned above, various operations can be handled in a different order or simultaneously, and operations may be added or omitted.

In this example, a first sheet of material for a first gore of the balloon envelope is provided at block 810. Lap seal material is arranged at least partially on the first sheet of material at block 820. A first heat seal is created between the lap seal material and the first sheet of material at block 830. A second sheet of material for a second gore of the balloon envelope is arranged over the first heat seal at block 830. A second heat seal is created between the lap seal material and the second sheet of material such that the lap seal material is configured to provide additional structural support to the balloon envelope at block 840.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of manufacturing a balloon envelope, the method comprising:
providing a first sheet of material for a first gore of the balloon envelope;
arranging lap seal material at least partially on the first sheet of material;
creating a first heat seal between the lap seal material and the first sheet of material;
arranging a second sheet of material for a second gore of the balloon envelope over the first heat seal; and
creating a second heat seal between the lap seal material and the second sheet of material such that the lap seal material is configured to provide additional structural support to the balloon envelope.

2. The method of claim 1, wherein the second heat seal is wider than the first heat seal.

3. The method of claim 1, wherein the second heat seal and the first heat seal extend along a length of the lap seal material corresponding to a length of the first and second gores.

4. The method of claim 1, further comprising, before creating the second heat seal, folding the lap seal material over onto itself.

5. The method of claim 4, further comprising applying pressure to the folded lap seal material in order to crease the folded lap seal material prior to arranging the second sheet of material.

6. The method of claim 4, wherein the lap seal material includes a substance configured to prevent the folded lap seal material from being heat sealed to itself.

7. The method of claim 1, wherein the lap seal material extends along only a portion of the first gore.

8. The method of claim 7, wherein the lap seal material is arranged such that the lap seal material is located proximate to an equator of the balloon envelope.

9. The method of claim 1, further comprising, after creating the first heat seal and in conjunction with creating the second heat seal, cutting away excess material.

10. The method of claim 1, wherein the first heat seal is created using a first heat sealing device and the second heat seal is created using a second heat sealing device different from the first heat sealing device.

11. The method of claim 1, wherein the first heat seal is created by heating a first portion of a heat sealer and the second heat seal is created by heating a second portion of the heat sealer that is wider than the first portion such that the first heat seal is narrower than the second heat seal.

* * * * *